Patented Dec. 1, 1953

2,661,301

UNITED STATES PATENT OFFICE 2,661,301

COMPOSITIONS COMPRISING BENTONITE-ORGANIC AMINE COMPOUNDS IN ASPHALTS, TARS, OR PITCHES

Robert G. Capell, Pittsburgh, Pa., assignor to Gulf Research & Development Company, Pittsburgh, Pa., a corporation of Delaware No Drawing. Application April 4, 1949,
Serial No. 85,479

12 Claims. (Cl. 106—281)

1

This invention relates to asphaltic and tarry compositions and to a method of making such compositions.

I have discovered in accordance with the invention that by dispersing bentonite-organic base compounds in asphalts, tars, or pitches, valuable compositions are obtained. While the compositions of the invention are principally useful for the purposes for which asphaltic and tarry materials have been used in the past, they differ materially from the raw materials used in their preparation in such properties as softening point, penetration and bleeding tendency. I have found, for example, that the dispersion of a small amount of a bentonite-organic base compound in an asphalt results in a novel composition having a higher softening point and better penetration characteristics than the asphalt raw material. The composition, therefore, is of greater value than the asphalt raw material in such applications as impregnated felts, paper coating, bituminized fabrics, paper lamination, floor coverings, roofing materials and the like.

The compositions of the invention are prepared by intimately dispersing a bentonite-organic base compound in the asphaltic or tarry raw material. If necessary, the asphaltic or tarry material is liquefied by heating prior to addition of the bentonite-organic base compound and the dispersion of the compound in the asphaltic or tarry material is accomplished while elevated temperature conditions are maintained. On cooling, the desired stable composition is obtained. The compositions are preferably prepared by introducing the asphaltic or tarry material and the bentonite-organic base compound into a mixing device such as a steam-heated paint mill or a heated colloid mill, and repeatedly passing the mixture in plastic or fluid form through the mixing device to subject the mixture to a mechanical shearing action until the desired degree of dispersion of the bentonite-organic base compound in the asphaltic or tarry material is obtained.

When a petroleum asphalt, such as a residuum of an asphaltic or mixed base crude, is mixed with a bentonite-organic base compound as above described, the resulting composition is substantially homogeneous in character, apparently because the bentonite compound is substantially uniformly dispersed throughout the asphalt so that in effect it not only becomes a part of the asphalt but also acts to hold, perhaps by its gelling action, the components of the asphalt in more uniform relation to one another. As a result the asphalt compositions are characterized in that the fusion point is raised and the tendency to bleed is decreased; the magnitude of such modifications depending upon the base stock employed and upon the amount of the bentonite-organic base compound added. Other properties of the compositions will be discussed as the description proceeds.

The compositions of the invention comprise a dispersion of a bentonite-organic base compound in any of the viscous liquid, semi-solid, or solid asphalts, tars and pitches, including natural asphalts, petroleum asphalts such as residuums of asphaltic or mixed base crudes, shale tar, peat tar, bitumens, tarry solvent extracts of petroleum fractions, coal tar, coal tar pitch, and wood tar. I have found that especially valuable results are obtained when a bentonite-organic base compound is dispersed in a petroleum asphalt, as the resulting product has higher softening point, lower penetration, and less bleeding tendency than the original asphalt.

The bentonite compounds employed in accordance with the invention are compounds composed of a montmorillonite mineral in which at least a part of the cation content of the mineral has been replaced by an organic base. Clays that swell at least to some extent on being contacted with water and contain as a primary constituent a mineral of the group known as montmorillonites are generally referred to as bentonites. Such clays, which contain exchangeable alkali metal atoms either naturally or after treatment, constitute the raw materials employed in making the bentonite-organic base compounds used in the improved asphalt compositions. So far as known all naturally occurring montmorillonites contain some magnesium and certain of them, as exemplified by Hector clay, contain such a high percentage of magnesium that they largely have magnesium in place of the aluminum content characteristic of the more typical montmorillonites.

The bentonite-organic base compounds are preferably prepared as described in U. S. Patent No. 2,033,856, issued March 10, 1936; by bringing together the bentonite and the organic base in the presence of aqueous mineral acid to effect base exchange. The organic bases should preferably be titratable with mineral acids. Among these reactive bases are many alkaloids, and cyclic, aliphatic, and heterocyclic amines. With the asphaltic and tarry materials described above, I prefer to use additive compounds prepared by bringing together a bentonite clay and such organic bases as aliphatic amines, their salts, and quaternary ammonium salts. Examples of such amines and salts are: decylamine, dodecylamine, tetradecylamine, hexadecylamine, octadecylamine, hexadecylammonium acetate, octadecylammonium acetate, dimethyldidodecylammonium acetate, dimethyldodecylhexadecyl ammonium acetate, dimethyldicetyl ammonium acetate, dimethyldioctyl ammonium acetate, dimethylhexadecyloctadecyl ammonium acetate, dimethyldioctadecyl ammonium acetate and the corresponding chlorides, and quaternary ammonium chlorides. The organic bases employed should be such as to impart substantial organophilic properties to the resulting compounds. The preferred bentonite compounds are prepared from quaternary ammonium compounds in which the N-substituents are aliphatic groups containing a total of at least 12 carbon atoms. When aliphatic amines are used they preferably contain at least 10 carbon atoms.

The bentonite-organic base compound may be combined with the asphaltic or tarry material in proportions varying over a wide range since the amount of the bentonite compound to be employed depends upon the properties of the raw material and the properties desired in the final composition. Thus, the invention, from one aspect, can be regarded as providing asphaltic and tarry compositions of controlled properties such as softening point, viscosity and penetration. For example, when employing a heavy asphalt, a relatively small amount of the bentonite-organic base compound will produce a composition having penetration characteristics that can be attained with the use of a light asphalt only by adding a substantially greater amount of the bentonite compound. While the bentonite compound may constitute as high as 50 per cent by weight or more of the compositions, ordinarily the desired results are obtained with the use of less than 10 per cent by weight. To produce compositions adapted to be employed for a variety of purposes, I prefer to use from about 0.1 to about 10 per cent by weight of the bentonite-organic base compound. Especially preferred compositions contain at least about 0.5 per cent of the bentonite compound and ordinarily more than 5 per cent of the compound is not required to produce the desired results. The improvement obtained with the use of less than 0.5 per cent of such a bentonite compound is only moderate in most cases and the addition of more than 5 per cent of the compound produces compositions which, when made from ordinary asphalts and tars, are relatively stiff and therefore especially valuable only in particular applications.

In some instances, as when using short or single chain aliphatic amine bentonite compounds for example, dispersion of the compound in the asphalt or tar can be facilitated by the use of one or more solvating agents. Suitable solvating agents are polar organic compounds such as organic acids, esters, alcohols, ethers, ketones, and aldehydes, especially low molecular weight compounds of these classes. Examples of suitable solvating agents are: ethyl acetate, acetic acid, acetone, methyl alcohol, ethyl alcohol, benzoyl chloride, butyl stearate, cocoanut oil, cyclohexanone, ethylene dichloride, ethyl ether, furfural, isoamyl acetate, methyl ethyl ketone, nitrobenzene, and toluene. Inasmuch as asphalts and tars are complex mixtures, certain of them naturally contain solvating agents and the use of extraneous agents even for dispersing the more difficultly dispersible bentonite-organic base compounds in such materials is not necessary. In cases where the use of a solvating agent is desirable for effecting more rapid and more complete dispersion of the bentonite-organic base compound in the asphaltic or tarry material, ordinarily only a relatively small amount or such an agent will be necessary. Thus, satisfactory results will usually be attained with the use of a solvating agent in an amount equal to about 1 to about 30 per cent by weight based on the amount of bentonite compound employed.

The advantages of the invention will be still better understood from the following examples:

EXAMPLE I 30 parts by weight of dimethyldicetyl-ammonium bentonite were added to 70 parts of a Mid-continent type residuum, blowing stock, being fluid at atmospheric temperature and having a viscosity of 69.4 Saybolt seconds at 210° F., and passed twice through a three-roll, steam-heated paint mill. The resultant product, at room temperature, was a stiff, plastic, moldable mass. This product was highly resistant to elevated temperatures and decomposed without melting. The product burns before melting. This composition may be used in the manufacture of laminates and is suitable for pipeline coatings, particularly where the pipe is lowered into the ditch immediately after applying the coating since solidification and drying of the coating is quite rapid.

EXAMPLE II

A composition prepared as in Example I but containing 20 per cent of the bentonite compound was tacky and pliable but still not capable of being melted or poured.

EXAMPLE III

A composition prepared as in Example I but containing 10 per cent of the bentonite compound was passed through the rolls repeatedly to give a product having a softening point of 181.8° F. (R & B). This product had the properties of an air-blown asphalt produced by 10 to 16 hours of blowing at 425° F. from the Mid-continent residuum. The product is more homogeneous than the air-blown asphalt.

The following table shows the effect of varying amounts of dimethyldicetyl-ammonium bentonite on the softening point of the Mid-continent residuum.

*Table I*

| Percent by Weight of Dimethyldicetyl-ammonium Bentonite in the Blend. | Viscosity of the Blend at 122° F. | | Softening Point of the Blend in Degrees F. (R. & B.) |
|---|---|---|---|
| | Centistokes | Saybolt Furol, Secs. | |
| 30 | | | |
| 20 | | | |
| 15 | | | |
| 10 | | | 181.8 |
| 5 | 46,039 | 21,638 | 96.8 |
| 2.5 | 17,742 | 8,339 | 70.7 |
| 0 | 2,624 | 1,233 | 41.0 |

No viscosities or softening points are given for some of the compositions in the above table because their viscosities and softening points were such as not to be determinable by the tests used.

The following table shows the effect of varying amounts of a dimethyldicetyl-ammonium bentonite on penetration and softening point of a Venezuelan petroleum residuum having a softening point of 110 to 115° F. (R & B) and a penetration of 116 at 77° F.

*Table II*

| Percent by Weight of Dimethyldicetyl-ammonium Bentonite in the Blend. | Penetration of the Blend at 70° F. (100 g.) 5 seconds | Softening Point of the Blend in Degrees F. (R. & B.) |
| --- | --- | --- |
| 30 | | |
| 20 | | |
| 15 | | |
| 10 | | |
| 5 | 55.7 | 129 |
| 2.5 | 62.9 | 122 |
| 1.0 | 73.4 | 116 |
| 0.5 | 82.9 | 113 |
| 0 | 97.2 | 109 |

EXAMPLE IV

Five compositions were prepared containing a coal tar pitch and proportions of dimethyldicetyl-ammonium bentonite as indicated in the following Table III. The compositions were prepared by mixing the coal tar pitch with the bentonite compound in a three-roll, steam-heated paint mill. The properties of these compositions and the coal tar pitch were determined and are given in Table III.

*Table III*

| Percent by Weight of Dimethyldicetyl-ammonium Bentonite in the Blend. | Penetration at 115° F. (200 g.) 5 seconds | Softening Point in Degrees F. (R. & B.) |
| --- | --- | --- |
| 0 | 55.1 | 220 |
| 0.5 | 33.3 | 250 |
| 1.0 | 34.8 | 260 |
| 2.5 | 23.6 | 280 |
| 5.0 | 15.1 | 337 |
| 10.0 | | |

The composition containing 10 per cent of the bentonite compound was too infusible to cast properly for these tests.

By using in place of the materials employed in the above examples other asphaltic and tarry materials, such as those previously mentioned, other valuable compositions are obtained. It will be understood that the compositions may contain various types of additives such as, for example, waxes, rubber, sulfur and the like in order to modify the properties of the compositions. Where additional moldability or spreading qualities are desired plasticizers such as dibutyl phthalate, octyl alcohol, and diethyl sebacate may be employed.

Obviously many modifications and variations of the invention as hereinbefore set forth may be made without departing from the spirit and scope thereof, and therefore only such limitations should be imposed as are indicated in the appended claims.

I claim:

1. A composition of matter comprising a dispersion of a compound of a bentonite and an organic nitrogen base in a material selected from the group consisting of asphalts, tars and pitches, the amount of said compound in said composition of matter constituting an amount within the range of about 0.1 to about 50 per cent by weight of said composition of matter.

2. A composition of matter comprising a dispersion of a minor proportion of a compound of a bentonite and an organic nitrogen base in a major proportion of a composition selected from the group consisting of asphalts, tars and pitches, the amount of said compound in said composition of matter being sufficient to increase the softening point and improve the penetration characteristics of said composition of matter.

3. A composition of matter comprising a dispersion of a compound of a bentonite and an organic nitrogen base in a petroleum asphalt, said bentonite compound being present in said composition in an amount corresponding to about 0.1 to about 10 per cent by weight of the composition.

4. A composition of matter comprising a dispersion of a compound of a bentonite and an organic nitrogen base in a coal tar pitch, said bentonite compound being present in said composition in an amount corresponding to about 0.1 to about 10 per cent by weight of the composition.

5. A composition of matter comprising a dispersion of a compound of a bentonite and an aliphatic organic nitrogen base in a petroleum asphalt, said bentonite compound being present in said composition in an amount corresponding to between about 0.5 and about 5 per cent by weight of the composition.

6. A composition of matter comprising a dispersion of a minor proportion of a compound of a bentonite and an organic nitrogen base containing at least 10 carbon atoms in an alkyl group in a major proportion of a composition selected from the group consisting of asphalts, tars and pitches, the amount of said compound in said composition of matter being sufficient to increase the softening point and improve the penetration characteristics of said composition of matter.

7. A composition of matter in accordance with claim 6 in which said compound of a bentonite and an organic nitrogen base is present in an amount corresponding to about 0.1 to about 10 per cent by weight of the composition of matter.

8. A composition of matter comprising a dispersion of a minor proportion of a compound of a bentonite and an organic nitrogen base containing at least 10 carbon atoms in an alkyl group in a major proportion of a petroleum asphalt.

9. A composition of matter in accordance with claim 8 in which said bentonite compound is present in said composition in an amount corresponding to about 0.1 to about 10 per cent by weight of the composition.

10. A composition of matter comprising a dispersion of a minor amount of dimethyldicetyl-ammonium bentonite in a major proportion of a composition selected from the group consisting of asphalts, tars and pitches.

11. A composition of matter in accordance with claim 10 in which said dimethyldicetyl-ammonium bentonite is present in an amount corresponding to about 0.1 to about 10 per cent by weight of the composition of matter.

12. A composition of matter comprising a dispersion of dimethyldicetyl-ammonium bentonite in a petroleum asphalt, said bentonite compound being present in said composition in an amount corresponding to about 0.1 to about 10 per cent by weight of the composition.

ROBERT G. CAPELL.

(References on following page)

References Cited in the file of this patent

UNITED STATES PATENTS

| Number | Name | Date |
|---|---|---|
| 2,033,856 | Smith | May 10, 1936 |
| 2,045,906 | Gardner et al. | June 30, 1936 |
| 2,314,111 | Tucker et al. | Mar. 16, 1943 |
| 2,326,723 | Fasold et al. | Aug. 10, 1943 |
| 2,427,398 | Ferguson et al. | Sept. 16, 1947 |
| 2,531,440 | Jordon | Nov. 28, 1950 |
| 2,531,812 | Hauser | Nov. 28, 1950 |

OTHER REFERENCES

Color Reactions between Clays and Amines, Journal American Chemical Society, vol. 62, pp. 1811–14–18. July 1940. (Copy in Library.)